(12) United States Patent
Toksoz et al.

(10) Patent No.: US 11,074,609 B1
(45) Date of Patent: Jul. 27, 2021

(54) SYSTEMS AND METHOD FOR IMPROVING MEDIATED SPONSORED CONTENT NETWORKS USING A STACK TRACE

(71) Applicant: Google LLC, Mountain View, CA (US)

(72) Inventors: Tuna Toksoz, Mountain View, CA (US); Thomas Price, San Francisco, CA (US)

(73) Assignee: Google LLC, Mountain View, CA (US)

( * ) Notice: Subject to any disclaimer, the term of this patent is extended or adjusted under 35 U.S.C. 154(b) by 775 days.

(21) Appl. No.: 15/059,689

(22) Filed: Mar. 3, 2016

(51) Int. Cl.
*G06Q 30/02* (2012.01)

(52) U.S. Cl.
CPC .................. *G06Q 30/0246* (2013.01)

(58) Field of Classification Search
CPC .................................................. G06Q 30/02
See application file for complete search history.

(56) References Cited

U.S. PATENT DOCUMENTS

| | | |
|---|---|---|
| 7,496,799 B2 | 2/2009 | Prang et al. |
| 8,341,721 B2 | 12/2012 | Kim et al. |
| 2010/0124907 A1* | 5/2010 | Hull ..................... G06Q 30/02 455/412.1 |
| 2011/0288932 A1* | 11/2011 | Marks ................... G06Q 10/06 705/14.49 |
| 2013/0111011 A1 | 5/2013 | Moulhaud et al. |
| 2016/0140031 A1* | 5/2016 | Sun ..................... G06F 11/3636 717/128 |

OTHER PUBLICATIONS

"Optimize Yield & Raise eCPM with Fyber's Predictive Algorithm for Mobile Ad Mediation" available at: https://blog.fyber.com/optimizing-yield-raising-ecpm-with-fybers-predictive-algorithm/ last accessed Jul. 2019 (Year: 2014).*

* cited by examiner

*Primary Examiner* — Katherine Kolosowski-Gager
(74) *Attorney, Agent, or Firm* — Foley & Lardner LLP

(57) ABSTRACT

Systems and methods are described for improving mediated sponsored content networks using a stack trace. One implementation relates to a method running on a sponsored content network and includes receiving a request for a sponsored content item from a user device executing code from a mediation platform. An item is sent to fulfill the request. If the identity of the mediation platform is not known, the sent item includes stack trace implementation code. An identifier is received that is associated with the mediation platform consequent to the user device executing the stack trace implementation code and the identity of the mediation platform is determined using the identifier. A performance metric associated with the determined identity of the mediation platform is identified. The method may further receive a second request for a sponsored content item from the user device and use the performance metric to select the second item.

20 Claims, 4 Drawing Sheets

SYSTEMS AND METHOD FOR IMPROVING MEDIATED SPONSORED CONTENT NETWORKS USING A STACK TRACE

BACKGROUND

Publishers may request content from multiple third-party content providers as part of choosing a sponsored content item to display with the publisher content. This is often done with the use of mediation platforms that interact with the third-party content providers. The mediation platforms chooses a third-party content provider and then the third party content provider network is responsible for requesting and serving the sponsored content items. A particular content provider in many circumstances does not know which provider of a mediation platform is providing the mediation platform that is requesting sponsored content items from the content provider network. The particular content provider may not be aware of sponsored content item rendering problems or other problems that may occur when the mediation platform affects the rendering of the sponsored content item.

SUMMARY

One implementation relates to a method running on one or more processors of a computing device of a sponsored content network and includes receiving a request for a sponsored content item from a user device executing code from a mediation platform. A sponsored content item is sent to the user device to fulfill the request. If the identity of the mediation platform is not known, the sent sponsored content item includes a stack trace. An identifier is received that is associated with the mediation platform consequent to the user device executing the stack trace and the identity of the mediation platform is determined using the identifier. A performance metric associated with the determined identity of the mediation platform is identified. The method may further receive a second request for a sponsored content item from the user device. Since the identity of the mediation platform is known when the second request for a sponsored content item is received, the selection of the second sponsored content item to send to the user device is based on the performance metric associated with the mediation platform. The second sponsored content item is then sent to the user device for display.

Another implementation relates to a system running on one or more processors of a sponsored content network operably connected to memory, wherein the memory stores instructions that, when executed by the at least one processor, cause the at last one processor to receive a request for a sponsored content item from a user device executing code from a mediation platform. The instructions further, upon execution, send a sponsored content item, consequent to receiving the request, the sponsored content item comprising stack trace implementation code, to the user device, receive an identifier associated with the mediation platform, consequent to the user device executing the stack trace implementation code, determine the identity of the mediation platform using the identifier; and identify a performance metric associated with the determined identity of the mediation platform. The system may further comprise instructions to receive a second request for a second sponsored content item from the user device, select a second sponsored content item, consequent to receiving the second request, the selection based on the performance metric, and send the second sponsored content item, consequent to receiving the second request.

Another implementation relates to non-transitory computer-readable storage media storing instructions that are executable by one or more processing devices to perform operations. Performing the operations may comprise receiving a request for a sponsored content item from a user device executing code from a mediation platform, sending a sponsored content item, consequent to receiving the request, the sponsored content item comprising stack trace implementation code, to the user device, receiving an identifier associated with the mediation platform, consequent to the user device executing the stack trace implementation code, determining the identity of the mediation platform using the identifier; and identifying a performance metric associated with the determined identity of the mediation platform. Performing the operation may further comprise receiving a second request for a second sponsored content item from the user device, selecting a second sponsored content item, consequent to receiving the second request, the selection based on the performance metric, and sending the second sponsored content item, consequent to receiving the second request to the user device.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

DETAILED DESCRIPTION

Following below are more detailed descriptions of various concepts related to, and implementations of, methods, apparatuses, and systems for improving mediated sponsored content networks using a stack trace. The various concepts introduced above and discussed in greater detail below may be implemented in any of numerous ways, as the described concepts are not limited to any particular manner of implementation. Specific implementations and applications are provided primarily for illustrative purposes.

In some instances, systems and methods for improving mediated sponsored content networks using a stack trace are desirable in order to determine the identity of the mediation platform being used to improve a mediated sponsored content network's prediction and performance capabilities. This may be most useful when mediation partners providing the mediation platforms do not actively provide their identity to sponsored content networks. In some instances, an advertisement network may lose some control over their own sponsored content items when the rendering of the sponsored content items are affected by the mediation platform or the mediation partner provided tool and such sponsored content rendering problems or other associated problems may go undetected. Such problems may include interference with the top layer of the frame of the sponsored content item, shrinking the size of the frame of the sponsored content item, and other rendering problems. The use of a stack trace allows for the identity of the mediation platform to be taken in to account when tabulating performance metrics and models of predicted click through rates and predicted conversions.

For purposes of reading the description of the various implementations below, the following descriptions of the sections of the specification and their respective contents may be helpful:

Section A describes an environment for a system for improving mediated sponsored content networks using a stack trace which may be useful for practicing implementations described herein.

Section B describes implementations of methods for improving mediated sponsored content networks using a stack trace.

Section C describes a network environment and computing environment which may be useful for practicing implementations described herein.

Figure 1:
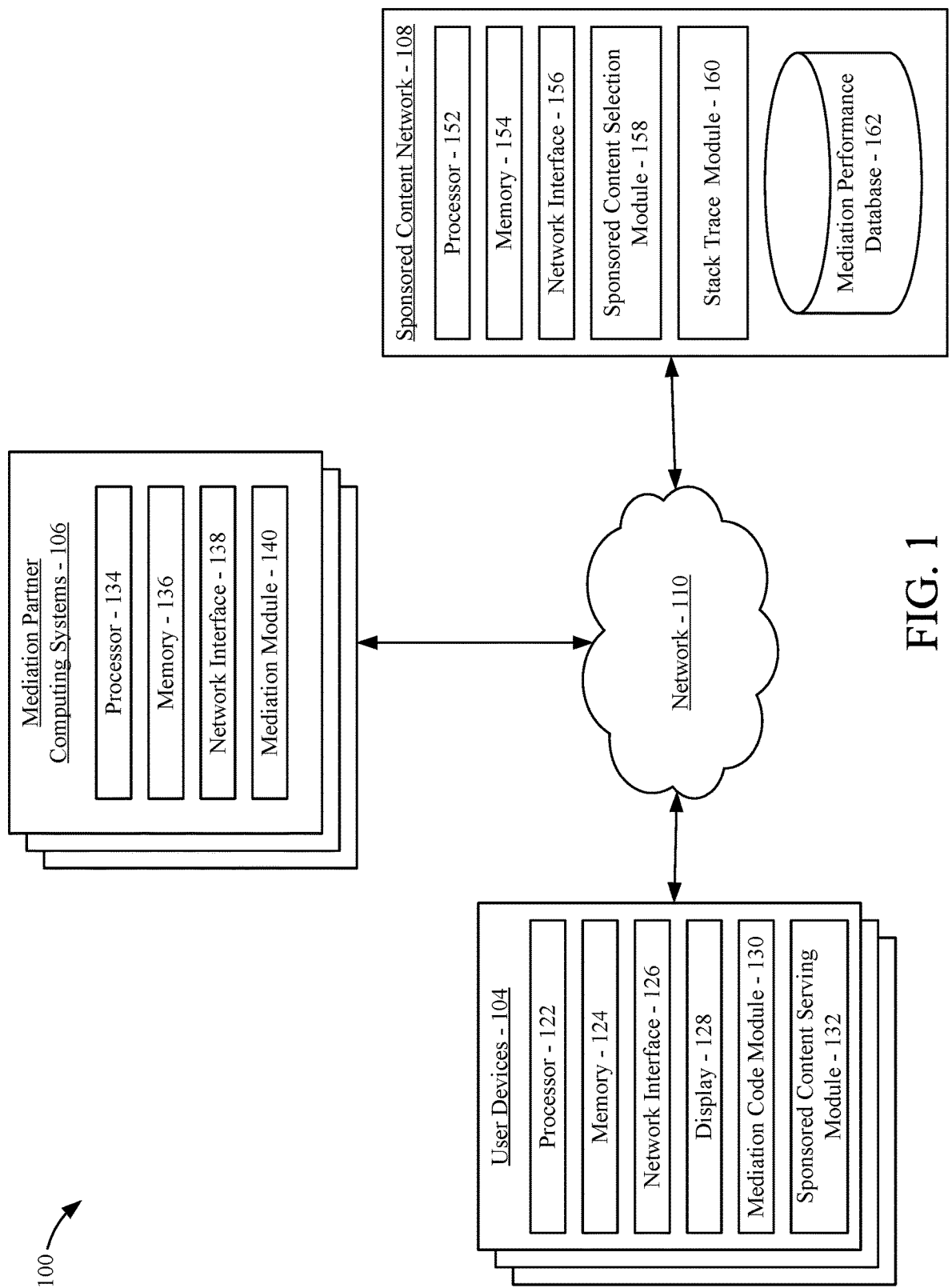
FIG. 1 is a block diagram depicting an implementation of an environment that may be used for improving mediated sponsored content networks using a stack trace.

A. Improving Mediated Sponsored Content Networks Using a Stack Trace Environment Prior to discussing the specifics of implementations of the systems and methods for improving mediated sponsored content networks using a stack trace, it may be helpful to discuss an implementation of an environment where such systems and methods may be deployed. FIG. 1 depicts one implementation of an environment 100. In brief overview, the environment comprises user devices 104, communicating over a network 110 to mediation partner computing systems 106 and a sponsored content network 108. The electronic user devices 104 may be any number of different types of personal and mobile devices configured to communicate via the network 110 (e.g., a laptop computer, a tablet computer, a smartphone, a digital video recorder, a set-top box for a television, a video game console, combinations thereof, etc.).

The network 110 may be any form of computer network that relays information between the user devices 104, the mediation partner computing systems 106 and the sponsored content network 108. In some arrangements, the network 110 may include the Internet and/or other types of data networks, such as a local area network (LAN), a wide area network (WAN), a cellular network, satellite network, or other types of data networks. The network 110 may also include any number of additional computing devices (e.g., computer, servers, routers, network switches, smartphones, tablets, mobile phones, etc.) that are configured to receive and/or transmit data within the network 110. These devices may aid connection to the network and may further use wireless communication methods such as a BLUETOOTH transceiver, a BLUETOOTH beacon, an RFID transceiver, Near Field Communication (NFC) transmitter or other similar technologies known in the art. The network 110 may further include any number of hardwired and/or wireless connections. For example, the user devices 104 may communicate wirelessly (e.g., via WiFi, cellular, radio, etc.) with a transceiver that is hardwired (e.g., via a fiber optic cable, a CAT5 cable, etc.) to other computing devices for communication over the network 110 to communicate with the sponsored content network 108. In some arrangements, reliable communication methods are used over the network with acknowledgment and resend if there is no acknowledgment received.

Still referring to FIG. 1, the user devices 104 as depicted include a processor 122 and a memory 124. The memory 124 may store machine instructions that, when executed by the processor 122, cause the processor 122 to perform one or more of the operations described herein. The processor 122 may include one or more microprocessors, application specific integrated circuits (ASICs), field programmable gate arrays (FPGAs), other forms of processing circuits, or combinations thereof. The memory 124 may include, but is not limited to, electronic, optical, magnetic, or any other storage or transmission device capable of providing the processor 122 with program instructions. The memory 124 may include storage devices such as a floppy disk, CD-ROM, DVD, magnetic disk, memory chip, ROM, RAM, EEPROM, EPROM, flash memory, optical media, or any other suitable memory from which the processor 122 can read instructions. The processor 122 and the memory 124 may form a processing module. The memory 124 may include files to run an operating system, a mediation code module 130, and a sponsored content serving module 132.

The user devices 104 are shown to include a network interface 126. In some arrangements, the network interface 126 is a hardware interface allowing data to pass to and from the network 110 (e.g., the internet). In some arrangements, the network interface 126 includes the hardware and logic necessary to communicate over multiple channels of data communication. For example, the network interface 126 may include an Ethernet transceiver, a cellular modem, a BLUETOOTH transceiver, a BLUETOOTH beacon, an RFID transceiver, and/or an NFC transmitter. Data passing through the network interface 126 may be encrypted such that the network interface 126 is a secure communication module.

The user devices 104 include a display 128. In some arrangements, the display 128 is combined with a user input device in the form of a touchscreen device. The display may be any electronic device that conveys data to a user by generating sensory information (e.g., a visualization, sounds, etc.). The display 128 may be internal to the housing of the user device 104 (e.g., a built-in display) or external to the housing of the user device 104 (e.g., a monitor connected to the user device 104), according to various implementations. For example, the user device 104 may include a display 128, which may display webpages, user interfaces for applications, and/or other visual sources of information. In various implementations, the display 128 may be located inside or outside of the same housing as that of the processor 122 and/or the memory 124. For example, the display 128 may be an external display, such as a computer monitor, television set, or any other stand-alone form of electronic display. In other examples, the display 128 may be integrated into the housing of a laptop computer, mobile device, smartphone, tablet, or other form of computing device having an integrated display.

In some arrangements, the display 128 and user input devices are combined in the form of a touchscreen device. The display 128 may be any electronic device that conveys data to a user by generating sensory information (e.g., a visualization, sounds, etc.). The input/output of a user device 104 (not shown) may be any electronic device that converts received information from a user into electronic signals (e.g., a keyboard, a mouse, a pointing device, a touch screen display, a microphone, etc.).

The user devices 104 are shown to include a mediation code module 130. In some arrangements, the mediation code module 130 has been transmitted indirectly from a mediation partner computing system 106 with publisher content for display on the user device 104 via the network 110. In some arrangements, portions of, or the entirety of, the mediation code module 130 has been statically compiled into the mobile application publishing the content. In some other arrangements, the mediation code module 130 has been obtained directly from a mediation partner computing system 106 via the network 110. In some arrangements, the mediation code module 130 is configured to choose from a selection of sponsored content networks 108 from which to request a sponsored content item for display on the user device 104. The sponsored content networks 108 may be accessible by the mediation code module 130 in the form of a table or list in the memory 124. In some arrangements, the mediation code module 130 selects the order or priority of sponsored content networks 108 to request a sponsored content item and if unsuccessful in a request from one sponsored content network 108, attempt to request a sponsored content item that follows in the order. In some arrangements, the mediation code module 130, activates a sponsored content serving module 132 as discussed further below. Both the mediation code module 130 and the sponsored content serving module 132 may have been embedded by a publisher (e.g., embedded into an application running on the user device 104) with the mediation partner code activating the sponsored content serving module code from a sponsored content network 108 on the user device 104. Upon activation of the sponsored content serving module 132, the mediation code module 130 is configured to wait for either a returned sponsored content item or a callback of no sponsored content item available. If no sponsored content item is returned, the mediation code module 130 may be configured to try the next sponsored content network 108 in the list.

The user devices 104 are shown to include a sponsored content serving module 132. In some arrangements, the sponsored content serving module 132 is configured to be activated by the mediation code module 130 and/or has been embedded by a publisher with the mediation partner code (e.g., with the mediation code module 130). In some arrangements, the sponsored content serving module 132 is configured to request a sponsored content item from an associated sponsored content network 108 upon activation by the mediation code module 130. The sponsored content serving module 132 is further configured to render the returned sponsored content item and handle interactions with the sponsored content including routing interactions with the sponsored content item to destination sites or landing URLs, launching of applications, counting clicks of the sponsored content item and the like.

The mediation partner computing systems 106 as depicted include a processor 134, a memory 136, and a network interface 138. The memory 136 may store machine instructions that, when executed by the processor 134, cause the processor 134 to perform one or more of the operations described herein. The processor 134 may include one or more microprocessors, application specific integrated circuits (ASICs), field programmable gate arrays (FPGAs), other forms of processing circuits, or combinations thereof. The memory 136 may include, but is not limited to, electronic, optical, magnetic, or any other storage or transmission device capable of providing the processor 134 with program instructions. The memory 136 may include storage devices such as a floppy disk, CD-ROM, DVD, magnetic disk, memory chip, ROM, RAM, EEPROM, EPROM, flash memory, optical media, or any other suitable memory from which the processor 134 can read instructions. The processor 134 and the memory 136 may form a processing module. The memory 136 may include files to run an operating system and a mediation module 140.

The mediation partner computing system 106 is shown to include a network interface 138. In some arrangements, the network interface 138 is a hardware interface allowing data to pass to and from the network 110 (e.g., the internet). In some arrangements, the network interface 138 includes the hardware and logic necessary to communicate over multiple channels of data communication. For example, the network interface 138 may include an Ethernet transceiver, a cellular modem, a BLUETOOTH transceiver, a BLUETOOTH beacon, an RFID transceiver, and/or an NFC transmitter. Data passing through the network interface 138 may be encrypted such that the network interface 138 is a secure communication module.

The mediation partner computing system 106 is shown to include a mediation module 140. In some arrangements, the mediation module 140 is configured to communicate directly with user devices 104 to provide mediation code. The mediation code when executed is configured to choose from a selection of sponsored content networks 108 from which to request a sponsored content item for display on the user device 104. In other arrangements, the mediation module 140 is configured to communicate indirectly with user devices (e.g., the mediation code is first provided to a publisher computing system). In some arrangements, the mediation module 140 is configured to provide only a configuration to be used by a mediation code module 130 already embedded in a publisher site page or application.

Still referring to FIG. 1, the sponsored content network 108 as depicted includes a processor 152, a memory 154, and a network interface 156. The memory 154 may store machine instructions that, when executed by the processor 152, cause the processor 152 to perform one or more of the operations described herein. The processor 152 may include one or more microprocessors, application specific integrated circuits (ASICs), field programmable gate arrays (FPGAs), other forms of processing circuits, or combinations thereof. The memory 154 may include, but is not limited to, electronic, optical, magnetic, or any other storage or transmission device capable of providing the processor 152 with program instructions. The memory 154 may include storage devices such as a floppy disk, CD-ROM, DVD, magnetic disk, memory chip, ROM, RAM, EEPROM, EPROM, flash memory, optical media, or any other suitable memory from which the processor 152 can read instructions. The processor 152 and the memory 154 may form a processing module. The memory 154 may include files to run an operating system, a sponsored content selection module 158, and a stack trace module 160.

The sponsored content network 108 is shown to include a network interface 156. In some arrangements, the network interface 156 is a hardware interface allowing data to pass to and from the network 110 (e.g., the internet). In some arrangements, the network interface 156 includes the hardware and logic necessary to communicate over multiple channels of data communication. For example, the network interface 156 may include an Ethernet transceiver, a cellular modem, a BLUETOOTH transceiver, a BLUETOOTH beacon, an RFID transceiver, and/or an NFC transmitter. Data passing through the network interface 156 may be encrypted such that the network interface 156 is a secure communication module.

The sponsored content network 108 is shown to include a sponsored content selection module 158. In some arrangements, the sponsored content selection module 158 is configured to communicate with user devices 104. Configuration for communication with user devices 104 may include being configured to receive sponsored content requests from mediation code modules 130 executing on the user devices 104. In some arrangements, a mediation code module 130 owned by a mediation partner activates an ad serving code module belonging to the sponsored content network 108. This ad serving code module then communicates with the sponsored content selection module 158 to request a sponsored content item and then render the sponsored content item that is returned. In some arrangements, additional data accompanies or is contained in the request regarding type of sponsored content, format, category, and/or display requirements of the requesting user device 104. The additional data may also include an identifier of the mediation partner that provided the mediation code. The sponsored content selection module 158 is configured to select a sponsored content item to satisfy the request and transmit the selected sponsored content item via the network 110 to the requesting user device 104. In some arrangements, the sponsored content selection module 158 selects a requested sponsored content item based on an identity of the mediation partner associated with the mediation platform initiating the request for the sponsored content item and performance metrics associated with the mediation partner.

The sponsored content network 108 is shown to include a stack trace module 160. In some arrangements, the stack trace module 160 is configured to communicate with user devices 104 via the network interface 156 and determines whether a request for a sponsored content item from the user device 104 is from a mediation platform associated with an identified mediation partner. In some arrangements, the mediation partner can be identified from information included in the request for the sponsored content item, the included information containing an identifier provided by the mediation code module 130 on the user device 104. In some arrangements, the stack trace module 160 is configured to determine that a previous association has been made with the user device 104, the publisher content displayed on the user device 104 and the identity of a mediation partner. In other arrangements, the identity of the mediation partner cannot be determined from the information contained in the sponsored content item request. In such arrangements, the stack trace module 160 may be configured to include a stack trace (e.g., stack trace code) with the sponsored content item that is selected to be sent to the user device 104. In other arrangements, the stack trace module 160 may provide an instruction for sponsored content item serving code on the user device to execute a stack trace. The stack trace code upon execution as part of the sponsored content item on the user device 104 is configured to access the stack running on the user device 104 and determine an identifier or an identity of the mediation partner that provided the mediation code module 130 running on the user device 104.

The sponsored content network 108 may also include a mediation performance database 162. The mediation performance database 162 may include files stored in non-volatile memory including files needed to run a sponsored content selection module 158 and a stack trace module 160. The sponsored content selection module 158 may use the mediation performance database in some arrangements, to access stored performance metrics associated with mediation partners, for use when selecting a sponsored content item. In such arrangements, the sponsored content items are stored in the mediation performance database and associated with the performance metrics. The stack trace module 160 may use the mediation performance database 162, in some arrangements, to store the results of a stack trace in order to associate a user device 104 and/or the published content displayed on the user device 104 with an identified mediation partner. Performance metrics may include revenue, click through rates, conversion rates, impressions and the like. In some arrangements, the sponsored content selection module 158 may be configured to use performance metrics stored in the database and associated with mediation partners to build predictive models of performance for stored sponsored content items. Predictive models of performance may include predicted sponsored content item clicks, predicted conversion rates, predicted impressions, and the like. The predictive models may also comprise direct comparisons of the performance metrics between mediation partners.

In some arrangements, one or more of the sponsored content selection or stack trace (e.g., the sponsored content selection module 158 and stack trace module 160) may be done on a separate computer system than the sponsored content network 108 with the results of the sponsored content selection or stack trace sent to the sponsored content network 108. The various modules as well as databases (e.g., mediation performance database 162 as depicted in the sponsored content network 108) may be done on other computing systems and servers and are not limited to the implementation as depicted. In some arrangements, the sponsored content selection may be done on the user device 104 with the sponsored content network 108 configured to provide a plurality of sponsored content items responsive to a request.

B. Methods for Improving Mediated Sponsored Content Networks Using a Stack Trace Referring now to FIG. 2, a block diagram of a method 200 of identifying a mediation platform and selecting a sponsored content item based on an associated performance metric is depicted according to an implementation. In some arrangements, the method 200 is performed by a processor 152 running instructions from a memory 154 on a sponsored content network 108. While performing the method 200, the sponsored content network communicates data over a network interface 156 over a network 110 to a network interface 126 of a user device 104. In brief overview of method 200, the method 200 includes the steps of receiving a request for a sponsored content item and identifying the mediation platform from the request. If the mediation platform is not able to be identified, sending a sponsored content item with a stack trace, receiving an identifier for a mediation platform, determining the identity of the mediation platform using the identifier, and associating information received with the request with the identified mediation platform. If the mediation platform is able to be identified from the information provided in the request, identifying performance metrics associated with the mediation platform, selecting a sponsored content item based on the identified performance metric, and sending the selected sponsored content item.

Figure 2:
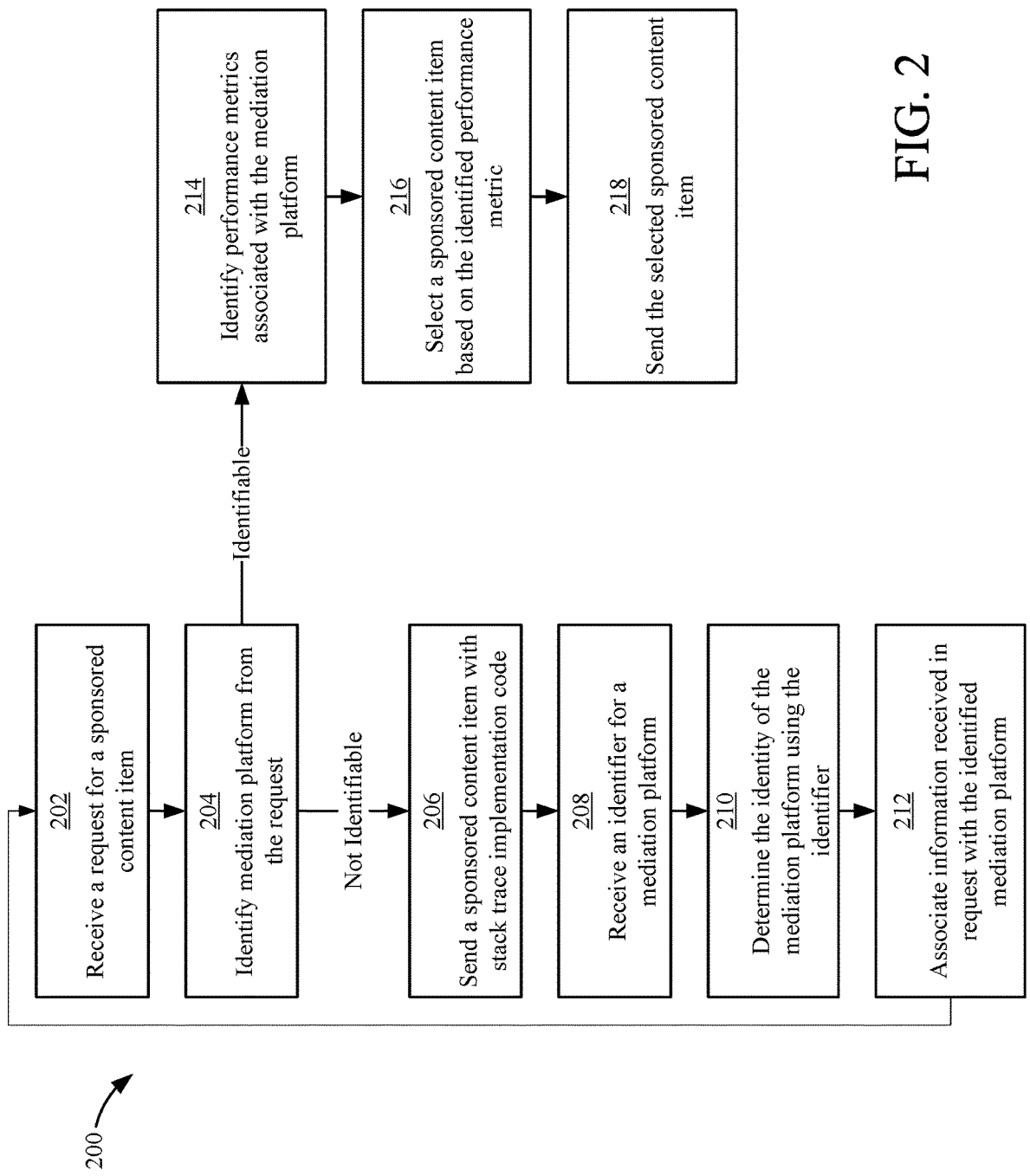
FIG. 2 is a block diagram depicting an implementation of a method of identifying a mediation platform and selecting a sponsored content item based on an associated performance metric.

Still referring to FIG. 2 and in more detail, the method 200 begins when a request for a sponsored content item is received at 202. In some arrangements, additional data accompanies or is contained in the request regarding type of sponsored content, format, category, information regarding the published content being displayed on the user device 104, information regarding the published content that will be displayed on the user device 104 along with the received sponsored content item, the publisher providing the published content, and/or display requirements of the requesting user device 104. In some arrangements, an identifier is also included in the request identifying a mediation partner associated with a mediation code module 130 running on the user device 104. The mediation code may be a client-side script embedded within an HTML or XHTML document or contained in a separate file as an external script. The mediation code may be Objective C or JAVA code embedded in a mobile application, or other types of code. In some arrangements, part or all of the mediation code stays on a separate server as a server-side script and executed when the user device 104 displaying publisher content requests a document.

A mediation platform is attempted to be identified from the information contained in the request at 204. In some instances, an identifier is also included in the request identifying a mediation platform or the mediation partner providing the mediation platform associated with a mediation code module 130 running on the user device 104. In other instances, there is no data contained in the request that can stand on its own to identify the mediation platform or the mediation partner and there is no data that is contained in the request that can be used to determine the identity of the mediation partner even when cross-referenced with known data. In some arrangements, however, the data contained in the request can be used to identify the mediation platform and/or the identity of the mediation partner by cross referencing with known data. The data contained in the request may include a unique identifier of the user device, a unique identifier of the user of the user device 104, a unique identifier of the publisher providing the published content displayed on the user device 104 and/or an identifier of the published content displayed on the user device 104. In some arrangements, one or more of the unique identifiers are associated with a mediation partner and can be used to determine the identity of the mediation partner. For example, a sponsored content item request is received that does not explicitly contain the identity of the mediation platform or mediation partner. However, the sponsored content item request does include a unique identifier of a publisher of publisher content being displayed on the user device 104 while the request for the sponsored content item is being sent. The mediation partner is determined by looking in a database where the unique identifier of the publisher is associated with the mediation partner.

In some arrangements where data allowing the identification of a mediation platform or the mediation partner providing the mediation platform on the user device 104 is included with the request, a stack trace has already been executed on the user device 104 prior to sending the request for a sponsored content item. The request may already contain an extracted or determined identifier that is associated with a known mediation platform or mediation partner. In some arrangements, the request includes the full or partial data obtained by the stack trace that can then be analyzed to determine and/or extract the identifier associated with a known mediation platform or partner. In other arrangements, the stack trace data or the identifier is sent separately from the request for a sponsored content item. The stack trace may be run in parallel to the request for the sponsored content item with the information from the stack trace being sent as a follow up to the request.

If the mediation platform or mediation partner being used is not identifiable at 204, a sponsored content item is sent at 206 comprising stack trace implementation code. In some arrangements, the stack trace implementation code comprises an instruction for a stack trace. In some instances, the stack trace implementation code is code executed when the sponsored content item is displayed (e.g., JAVASCRIPT). The stack trace implementation code may comprise a script (e.g., JAVASCRIPT, ECMAScript, Tcl, Python, Perl, Ruby, etc.) a web API (e.g., a plug-in API), a widget, an embedded application built using a provided API, an embedded application developed using a provided SDK and the like.

An identifier for a mediation platform or mediation partner is received at 208. In some arrangements, the identifier is sent by the user device 104 responsive to display and/or execution of the sent sponsored content item. The display and/or execution of the sent sponsored content item may result in a stack trace executing on the user device 104 to determine the mediation platform or mediation code running on the user device 104 responsible for requesting the sponsored content item and the associated mediation partner. The identifier may be an alphanumeric or text string unique to a mediation platform or mediation partner. In some arrangements, other data is sent with the identifier and may include one or more of the associated publisher (e.g., publisher ID), an associated sponsored content network (e.g., sponsored content network ID), time and date requested or received at a user device 104, time and date displayed at a user device 104, description or identifier of the published content displayed with the sponsored content item, and the like.

The identity of the mediation platform or mediation partner is determined using the received identifier at 210. In some arrangements, the identity of the mediation platform or mediation partner is determined by the sponsored content network 108 using information retrieved from the mediation performance database 162. The identifier may comprise an alphanumeric or text string that is referenced in a database and associated with a mediation partner. In some instances, the identifier may have to be parsed to locate the matching reference in the database. In some arrangements, the identifier may comprise a link (e.g., a website URL), which may need to be accessed by the sponsored content network 108 in order to receive additional data in order to determine the identity of the mediation partner.

The identified mediation platform or mediation partner is associated with additional information received in the request for a sponsored content item at 212. In some arrangements, the additional information is received with the identifier, the additional information is received with both the request and the identifier, the additional information is received separately consequent to display the sponsored content item on the user device 104, or some combination of these. In some arrangements, the information and the association is stored by the sponsored content network 108 in a mediation performance database 162. Additional information associated with the identified mediation platform or mediation partner may comprise a unique identifier of the user device 104, a unique identifier of the user of the user device 104, a unique identifier of the publisher providing the published content displayed on the user device 104, an identifier of the published content displayed on the user device 104 and the like.

If the mediation platform or mediation partner being used is identifiable at 204, performance metrics associated with the mediation platform are identified at 214. In some arrangements, the performance metrics associated with the mediation platform are stored by a sponsored content network 108 in a database (e.g., mediation performance database 162). Performance metrics may comprise revenue, click through rates, conversion rates, impressions and the like. In some arrangements, the performance metrics are further separated and categorized by particular sponsored content items, categories of sponsored content items, sponsored content item format, and the like. Sponsored content item formats may include a type of sponsored content item (e.g., static or animated), height and width restrictions, color, resolution, and the like.

A sponsored content item is selected based at least in part on an identified performance metric at 216. In some arrangements, the sponsored content item is selected by a sponsored content selection module 158 of a sponsored content network 108 using a performance metric retrieved from a database (e.g., the mediation performance database 162). The sponsored content item may be selected from a plurality of stored sponsored content items. In some arrangements, the sponsored content item is also selected based on restrictions contained in the request for a sponsored content item (e.g., format, size, category, etc.). In some arrangements, no sponsored content item is selected. For example, the performance metric (e.g., click through rate) of all the available sponsored content items as associated with the identified mediation partner are determined to be too low and no sponsored content item is supplied to fulfill the request. In some arrangements, the selection of the sponsored content item is based on the performance metric exceeding a predetermined threshold. In some arrangements, the sponsored content items may be ranked according to the value of the performance metric and higher ranked sponsored content items with higher values of the performance metric as associated with the mediation platform or mediation provider may be given more weight during the selection. In some other arrangements, the value of the performance metric as associated with each of the available sponsored content items is part of a predictive model comparing the performance of the determined mediation provider to a plurality of other mediation providers and the predictive model is used to determine whether on of the available sponsored content items should be sent.

The selected sponsored content item is sent at 218. In some arrangements, the selected sponsored content item is sent by sponsored content network 108 to a user device 104 for display along with publisher content. In some instances, no sponsored content item is selected at 216 and the request for the sponsored content item is refused. In some arrangements, information on performance of the sponsored content item is received by the sponsored content network 108 upon display of the selected sponsored content item at the user device 104 and may include an impression, a click-through, a conversion, and the like. Received performance information may be associated in a database (e.g., the mediation performance database 162) with the mediation platform sending the request by updating the performance metric information. In some arrangements, the performance metric information may further be associated with the publisher, the publisher content displayed on the user device 104 with the sponsored content item, time/day of presentation of the sponsored content item, identifier of a user of the user device 104, demographic information of a user of the user device 104, and the like Referring now to FIG. 3, a block diagram of a method 300 of executing a stack trace and sending an identifier of a mediation platform is depicted according to an implementation. In some arrangements, the method 300 is performed by a processor 122 running instructions from a memory 124 on a user device 104. While performing the method 300, the user device 104 communicates data over a network interface 126 over a network 110 to a network interface 138 of a mediation partner computing system 106 and/or a network interface 156 of a sponsored content network 108. In brief overview of method 300, the method 300 includes the steps of receiving mediation code, executing the mediation code, receiving a sponsored content item comprising a stack trace implementation code, executing the stack trace implementation code, and sending an identifier of a mediation platform associated with the mediation code.

Figure 3:
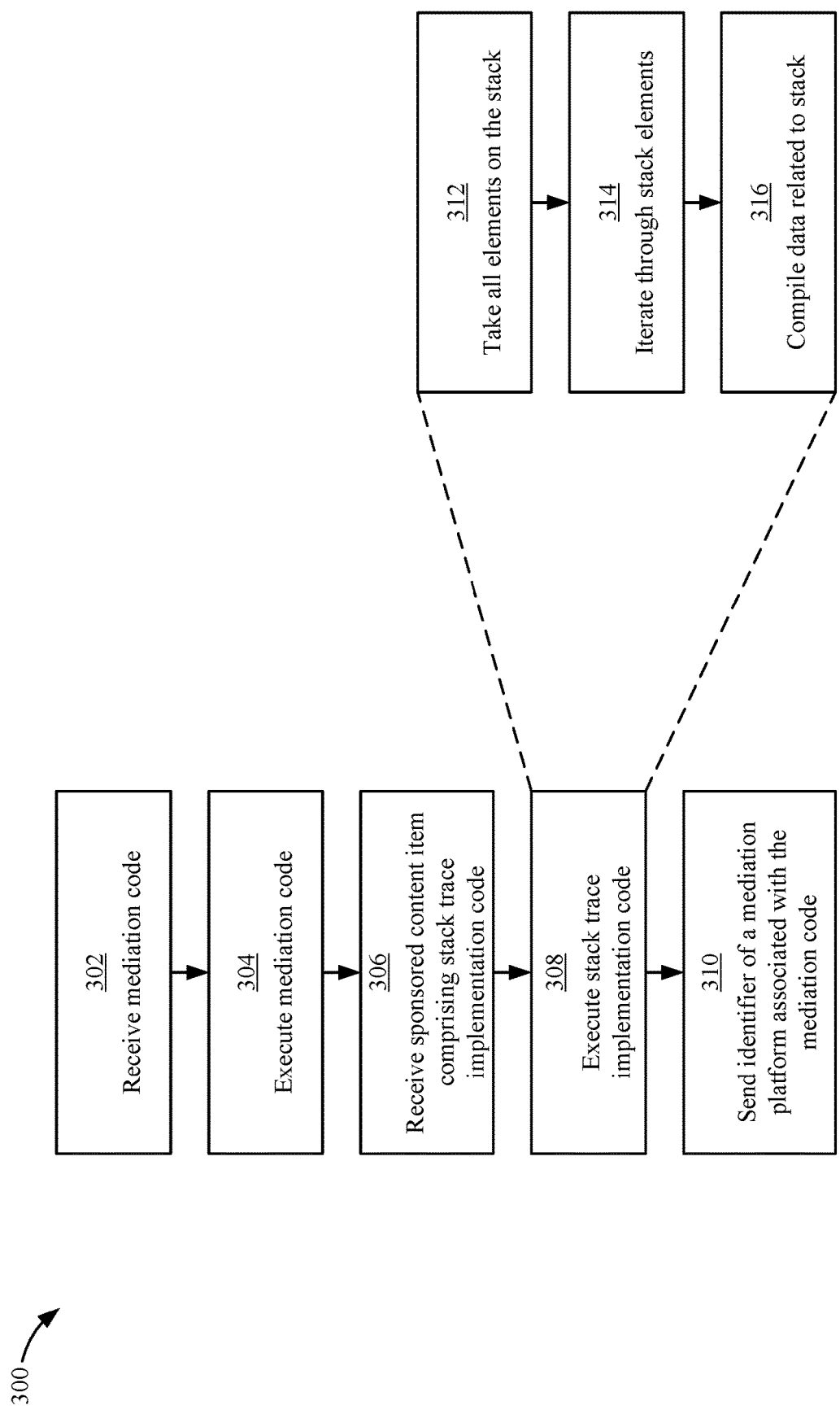
FIG. 3 is a block diagram depicting an implementation of a method of executing a stack trace and sending an identifier of a mediation platform.

Still referring to FIG. 3 and in more detail, the method 300 begins when mediation code is received at 302. In some arrangements, the mediation code is received by a user device 104. In some arrangements, the mediation code is provided as part of publisher content by a publisher after a mediation partner has provided the mediation code to the publisher. The mediation code may be a client-side script embedded within an HTML or XHTML document, Objective C code or JAVA code embedded in a mobile application, or contained in a separate file as an external script and the like. Other implementations are also possible. In some arrangements, part or all of the mediation code stays on the server as a server-side script and executed when the user device 104 displaying publisher content requests a document.

The mediation code is executed at 304. In some arrangements, the mediation code is executed by a processor of the user device 104 running a web browser. Execution of the mediation code may determine the selection of a sponsored content provider from a plurality of sponsored content providers from which to request a sponsored content item. In this implementation, the sponsored content provider is a provider such as a sponsored content network 108. In some arrangements, execution of the mediation code supplied by a mediation provider code on the user device activates a sponsored content network's code to make an ad request. As part of making the request for a sponsored content network, code supplied by the sponsored content network checks to see if there is a value in local storage of the user device for which mediation provider is being used. If no value in local storage is located the sponsored content network code comprising stack trace implementation code executes a stack trace, attaches the result to the initial sponsored content item request, and also caches the result for later. If a cached value was already there in local storage on the user device, the sponsored content network code attaches this cached value to the sponsored content item request. The sponsored content network 108, upon receiving the sponsored content item request, may identify the mediation provider based on the results of the stack trace that were included in the sponsored content item request. In some arrangements, the results of the stack trace may be some or all of the data returned from the stack trace (i.e., the raw results) or the identifier of the mediation provider may have already been extracted and identified from the stack trace data. The identity of the mediation provider or the use of the stack trace itself may be used as a signal to identify a performance metric for the sponsored content network 108 with the performance metric used in the selection of a sponsored content item.

A sponsored content item is received at 306. In some arrangements, the sponsored content item is received by the user device 104 running mediation code contained in a mediation code module 130 and the sponsored content item comprises stack trace implementation code. In some arrangements, the sponsored content item is an image (static or animated). Other sponsored content item formats are possible such as text, videos, widgets, interactive items (e.g., Flash format), and the like. In some arrangements, the sponsored content item only comprises stack trace implementation code if the mediation platform or associated mediation partner is not identifiable from the information sent when the sponsored content item was requested (e.g., by a web browser running the mediation code on the user device 104).

The stack trace implementation code is executed at 308. In some arrangements, the stack trace implementation code is executed when the received sponsored content item is displayed on a user device 104. The execution of the stack trace implementation code may be automatic upon display of the sponsored content item (e.g., in a web browser running on the user device 104. In some arrangements, the stack trace implementation code may comprise a script (e.g., JAVASCRIPT, ECMAScript, Tcl, Python, Perl, Ruby, etc.) a web API (e.g., a plug-in API), a widget, an embedded application built using a provided API, an embedded application developed using a provided SDK and the like. In some arrangements, executing the stack trace implementation code results in the call stack (i.e., execution stack) running on the user device 104 being searched. The search may include detection of unique strings that can be associated with the mediation platform also running on the user device 104 and the mediation partner. The search may include determining a frame associated with the mediation activity and the mediation platform. In some arrangements, the current stack is retrieved using built-in support via system calls. In other arrangements, the current stack is retrieved using a stacktrace library. Still in some other arrangements, the stack may be retrieved from a thrown exception.

In some arrangements, the stack trace implementation code is on a user device as part of a sponsored content network's code and executed prior to a request for a sponsored content item being sent to the associated sponsored content network 108. In this arrangement, the stack trace is executed prior to requesting the sponsored content item. Upon execution, the sponsored content network's code checks if there is a previously stored value in local storage associated with the particular mediation partner being used. If there has been no value previously stored by the sponsored content network's code, the stack trace is run to determine the particular mediation partner. In some arrangements, the full result of the stack trace or a subset of the full result may be stored in local storage. In other arrangements, the stack trace implementation code may extract and/or identify an identifier associated with a mediation partner and store the identifier in local storage. The results (the result of the stack trace or just the extracted identifier) are attached and sent along with the sponsored content item request. Further requests for sponsored content items can use the results that are now stored in local storage without having to run a further stack trace on subsequent activations of the sponsored content network's code.

An identifier of a mediation platform or mediation partner associated with the mediation code is sent at 310. In some arrangements, the mediation code is running on a user device 104 and the identifier is sent to a sponsored content network 108, the sponsored content network 108 having provided a sponsored content item to the user device 104. The stack trace implementation code is executed when the received sponsored content item is displayed on a user device 104. The execution of the stack trace implementation code may be automatic upon display of the sponsored content item (e.g., in a web browser running on the user device 104. In some arrangements, the stack trace implementation code may comprise a script (e.g., JAVASCRIPT, ECMAScript, Tcl, Python, Perl, Ruby, etc.) a web API (e.g., a plug-in API), a widget, an embedded application built using a provided API, an embedded application developed using a provided SDK and the like. In some arrangements, the identifier has already been extracted from the data gathered from the stack trace. In other arrangements, the identifier is sent as part of data compiled from some or all the stack trace elements on the stack.

Further details of one implementation of executing stack trace implementation code is shown in steps 312, 314, and 316. In brief overview, the implementation includes the steps of taking all the elements on the stack 312, iterating through the stack elements 314 and compiling data related to the stack 316. In some arrangements, taking all the elements on the stack 312 may include accessing stack elements, frames or other structures of the stack in an array, a list, or other ordered structure upon execution of the stack trace implementation code. In some arrangements, taking all the elements may include parsing returned metadata, e.g., from metadata from a thrown exception returning a stack trace.

The stack elements are iterated through at 314. In some arrangements, stack elements may be ignored that are determined to be stack elements created by execution of the stack trace implementation code. These stack elements may be identified by the class names present in the elements taken on the stack. In some arrangements, iteration through the stack elements also includes truncation of the names of classes to better identify class names as there may be noise or less useful data after the third ".". This may aid in extracting the portions of extracted class names that are unique and consistent for a given mediation provider and also eliminate possible version numbers.

Data related to the stack is compiled at 316. In some arrangements, some or all the data from every element in the stack may be compiled for further analysis. In other arrangements only data from certain elements of the stack that have the highest probability of containing useful information on mediation providers is compiled. For example, it may be determined that the element of the stack directly above the stack element of the stack trace implementation is the most likely to be the stack element of the mediation code of the mediation provider instantiating the sponsored content serving code. This may aid in extracting the portions of extracted class names that are unique and consistent for a given mediation provider and also eliminate possible version numbers.

C. Network and Computing Environment

Figure 4:
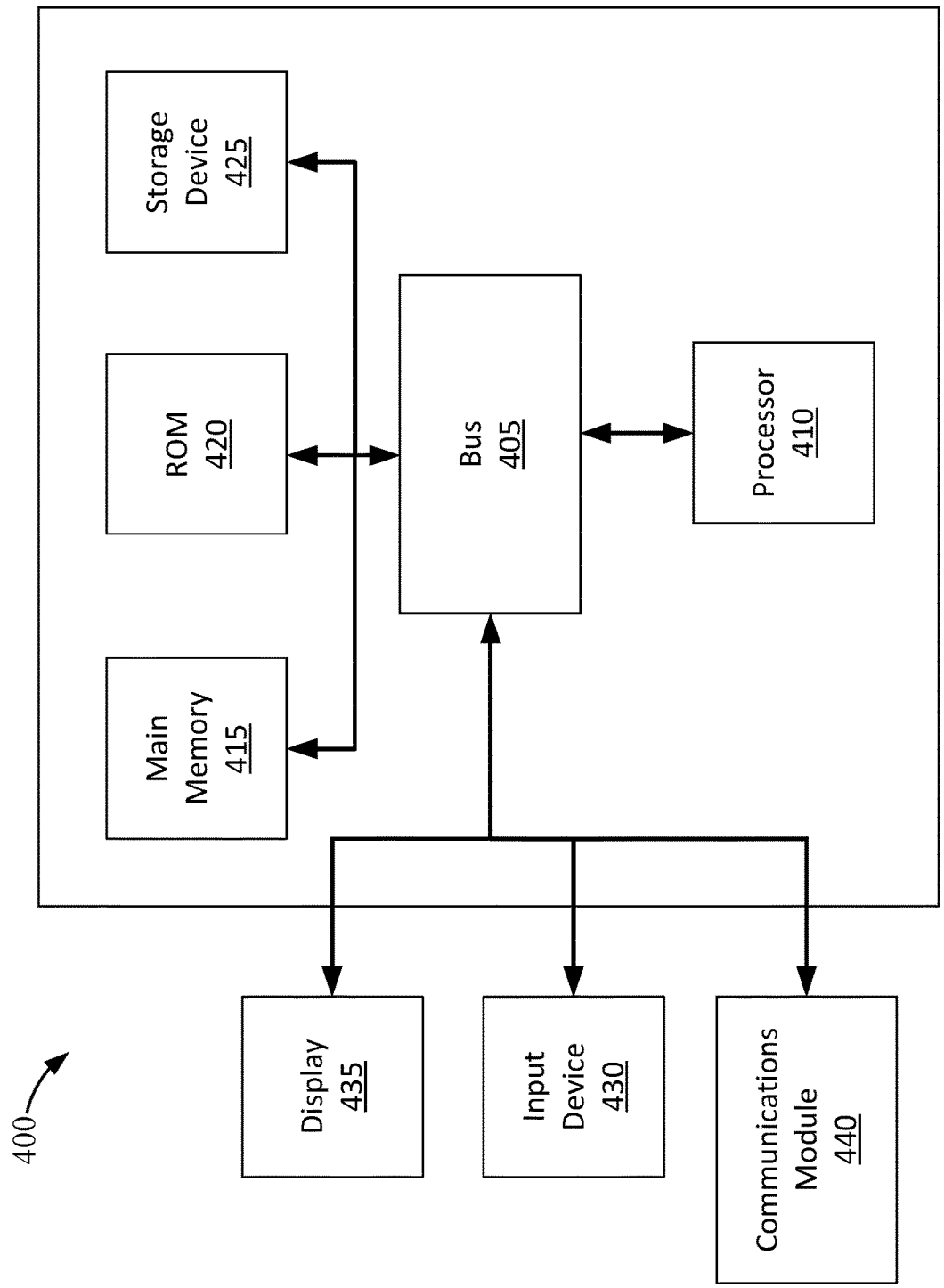
FIG. 4 is a block diagram depicting a general architecture for a computer system that may be employed to implement various elements of the systems and methods described and illustrated herein.

FIG. 4 is a block diagram of a computer system 400 that can be used to implement the user devices 104, the mediation partner computing systems 106, and the sponsored content network 108 and/or any other computing device described herein. The computing system 400 includes a bus 405 or other communication component for communicating information and a processor 410 or processing module coupled to the bus 405 for processing information. The computing system 400 also includes a main memory 415, such as a RAM or other dynamic storage device, coupled to the bus 405 for storing information, and instructions to be executed by the processor 410. The main memory 415 can also be used for storing position information, temporary variables, or other intermediate information during execution of instructions by the processor 410. The computing system 400 may further include a ROM 420 or other static storage device coupled to the bus 405 for storing static information and instructions for the processor 410. A storage device 425, such as a solid state device, magnetic disk or optical disk, is coupled to the bus 405 for persistently storing information and instructions. The device of the computing system 400 may include, but is not limited to, digital computers, such as laptops, desktops, workstations, personal digital assistants, servers, blade servers, mainframes, cellular telephones, smart phones, mobile computing devices (e.g., a notepad, e-reader, etc.), etc.

The computing system 400 may be coupled via the bus 405 to a display 435, such as a Liquid Crystal Display (LCD), Thin-Film-Transistor LCD (TFT), an Organic Light Emitting Diode (OLED) display, LED display, Electronic Paper display, Plasma Display Panel (PDP), and/or other display, etc., for displaying information to a user. An input device 430, such as a keyboard including alphanumeric and other keys, may be coupled to the bus 405 for communicating information and command selections to the processor 410. In another implementation, the input device 430 may be integrated with the display 435, such as in a touch screen display. The input device 430 can include a cursor control, such as a mouse, a trackball, or cursor direction keys, for communicating direction information and command selections to the processor 410 and for controlling cursor movement on the display 435.

According to various implementations, the processes and/or methods described herein can be implemented by the computing system 400 in response to the processor 410 executing an arrangement of instructions contained in the main memory 415. Such instructions can be read into the main memory 415 from another computer-readable medium, such as the storage device 425. Execution of the arrangement of instructions contained in the main memory 415 causes the computing system 400 to perform the illustrative processes and/or method steps described herein. One or more processors in a multi-processing arrangement may also be employed to execute the instructions contained in the main memory 415. In alternative implementations, hard-wired circuitry may be used in place of or in combination with software instructions to effect illustrative implementations. Thus, implementations are not limited to any specific combination of hardware circuitry and software.

The computing system 400 also includes a communications module 440 that may be coupled to the bus 405 for providing a communication link between the system 400 and the network 110. As such, the communications module 440 enables the processor 410 to communicate, wired or wirelessly, with other electronic systems coupled to the network 110. For instance, the communications module 440 may be coupled to an Ethernet line that connects the system 400 to the Internet or another network 110. In other implementations, the communications module 440 may be coupled to an antenna (not shown) and provides functionality to transmit and receive information over a wireless communication interface with the network 110.

In various implementations, the communications module 440 may include one or more transceivers configured to perform data communications in accordance with one or more communications protocols such as, but not limited to, WLAN protocols (e.g., IEEE 802.11 a/b/g/n/ac/ad, IEEE 802.16, IEEE 802.20, etc.), PAN protocols, Low-Rate Wireless PAN protocols (e.g., ZIGBEE, IEEE 802.15.4-2003), Infrared protocols, BLUETOOTH protocols, EMI protocols including passive or active RFID protocols, and/or the like.

The communications module 440 may include one or more transceivers configured to communicate using different types of communication protocols, communication ranges, operating power requirements, RF sub-bands, information types (e.g., voice or data), use scenarios, applications, and/or the like. In various implementations, the communications module 440 may comprise one or more transceivers configured to support communication with local devices using any number or combination of communication standards. In various implementations, the communication module 440 can also exchange voice and data signals with devices using any number of standard communication protocols.

Although an example computing system 400 has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and the operations described in this specification can be implemented in digital electronic circuitry, or in computer software embodied on a non-transitory tangible medium, firmware, or hardware, including the structures disclosed in this specification and their structural equivalents, or in combinations of one or more of them. The subject matter described in this specification can be implemented as one or more computer programs, i.e., one or more modules of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be performed by a data processing apparatus on data stored on one or more computer-readable storage devices or received from other sources.

The term "data processing apparatus" or "computing device" or "processing module" encompasses all kinds of apparatus, devices, and machines for processing data, including by way of example a programmable processor, a computer, a system on a chip, or multiple ones, a portion of a programmed processor, or combinations of the foregoing. The apparatus can include special purpose logic circuitry, e.g., an FPGA or an ASIC. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products embodied on tangible media.

References to "or" may be construed as inclusive so that any terms described using "or" may indicate any of a single, more than one, and all of the described terms.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The claims should not be read as limited to the described order or elements unless stated to that effect. It should be understood that various changes in form and detail may be made by one of ordinary skill in the art without departing from the spirit and scope of the appended claims. All implementations that come within the spirit and scope of the following claims and equivalents thereto are claimed.

What is claimed is:

1. A method comprising:
   receiving, by a server including one or more processors, a request for a sponsored content item from a mediation platform executed by a user device, wherein the request does not identify the mediation platform and the user device executes a plurality of mediation platforms;
   transmitting, by the server, a selected sponsored content item to the user device responsive to receiving the request, the selected sponsored content item comprising stack trace implementation code configured to execute on the user device, cause the user device to access a stack executing on the user device, and cause the user device to transmit, to the server, data including an identifier identifying the mediation platform;
   receiving, by the server, the identifier identifying the mediation platform from the user device, responsive to the user device executing the stack trace implementation code to access the stack to determine the identifier identifying the mediation platform;
   determining, by the server, an identity of the mediation platform using the identifier;
   identifying, by the server, a performance metric associated with the determined identity of the mediation platform;
   receiving, by the server, a second request for a sponsored content item from the user device;
   selecting, by the server, a second sponsored content item, responsive to receiving the second request, the selection based on the performance metric; and
   transmitting, by the server, the second sponsored content item, responsive to receiving the second request.

2. The method of claim 1, wherein the second sponsored content item is selected from a plurality of sponsored content items and two or more of the sponsored content items from the plurality of sponsored content items are associated with different values of the performance metric based on an association of the performance metric with the determined identity of the mediation platform.

3. The method of claim 1, wherein the performance metric is one of a click through rate, conversion rate, revenue rate and impression rate.

4. The method of claim 2, wherein the performance metric is one of a click through rate, conversion rate, revenue rate, and impression rate and the selection of the second sponsored content item is further based on a value of the performance metric exceeding a predetermined threshold.

5. The method of claim 1, further comprising identifying, by the server, a predictive model of the performance metric comparing the determined mediation platform to one or more other mediation platforms.

6. The method of claim 5, wherein the predictive model of the performance metric is used to compare a predicted performance of a second sponsored content item and the determined mediation platform to a predictive performance of the second sponsored content item to each of the one or more other mediation platforms, and the method further comprising:
- receiving, by the server, a second request for a sponsored content item from the user device;
- selecting, by the server, a second sponsored content item, responsive to receiving the second request, the selection based on using the predictive model; and
- sending, by the server, the second sponsored content item, responsive to receiving the second request, to the user device.

7. A system comprising:
at least one processor; and
memory that is operatively coupled to the at least one processor, wherein the memory stores instructions that, when executed by the at least one processor, cause the at least one processor to:
- receive a request for a sponsored content item from a user device executing code from a mediation platform executed by a user device, wherein the request does not identify the mediation platform and the user device executes a plurality of mediation platforms;
- transmit a selected sponsored content item to the user device responsive to receiving the request, the selected sponsored content item comprising stack trace implementation code, the stack trace implementation code configured to execute on the user device, cause the user device to access a stack executing on the user device, and cause the user device to transmit, to the memory, data including an identifier identifying the mediation platform;
- receive the identifier identifying the mediation platform, responsive to the user device executing the stack trace implementation code to access the stack to determine the identifier identifying the mediation platform;
- determine the identity of the mediation platform using the identifier;
- identify a performance metric associated with the determined identity of the mediation platform;
- receive a second request for a sponsored content item from the user device;
- select a second sponsored content item, responsive to receiving the second request, the selection based on the performance metric; and
- transmit the second sponsored content item, responsive to receiving the second request.

8. The system of claim 7, wherein the second sponsored content item is selected from a plurality of sponsored content items and two or more of the sponsored content items from the plurality of sponsored content items are associated with different values of the performance metric based on an association of the performance metric with the determined identity of the mediation platform.

9. The system of claim 7, wherein the performance metric is one of a click through rate, conversion rate, revenue rate and impression rate.

10. The system of claim 8, wherein the performance metric is one of a click through rate, conversion rate, revenue rate, and impression rate and the selection of the second sponsored content item is further based on a value of the performance metric exceeding a predetermined threshold.

11. The system of claim 7, further comprising instructions causing the at least one processor to identify a predictive model of the performance metric comparing the determined mediation platform to one or more other mediation platforms.

12. The system of claim 11, wherein the predictive model of the performance metric is used to compare a predicted performance of a second sponsored content item and the determined mediation platform to a predictive performance of the second sponsored content item to each of the one or more other mediation platforms.

13. One or more non-transitory computer-readable storage media storing instructions that are executable by one or more processing devices to perform operations comprising:
- receiving a request for a sponsored content item from a mediation platform executed by a user device, wherein the request does not identify the mediation platform and the user device executes a plurality of mediation platforms;
- transmitting a selected sponsored content item to the user device responsive to receiving the request, the selected sponsored content item comprising stack trace implementation code configured to execute on the user device, cause the user device to access a stack executing on the user device, and cause the user device to transmit, to the one or more processing devices, data including an identifier identifying the mediation platform;
- receiving identifier identifying the mediation platform, responsive to the user device executing the stack trace implementation code to access the stack to determine the identifier identifying the mediation platform;
- determining an identity of the mediation platform using the identifier;
identifying a performance metric associated with the determined identity of the mediation platform
- receiving a second request for a sponsored content item from the user device;
- selecting a second sponsored content item, responsive to receiving the second request, the selection based on the performance metric; and
- transmitting the second sponsored content item, responsive to receiving the second request.

14. The non-transitory computer-readable storage media of claim 13, further storing instructions to perform operations comprising:

receiving a second request for a sponsored content item from the user device;

selecting a second sponsored content item, consequent to receiving the second request, the selection based on the performance metric; and transmitting the second sponsored content item, consequent to receiving the second request.

15. The method of claim 1 further comprising:

determining an identity of a mediation provider based on the identity of the mediation platform, wherein the performance metric is further associated with the identity of the mediation provider;

selecting a second sponsored content item based on the associated performance metric;

transmitting the second sponsored content item to the user device.

16. The method of claim 15, wherein the received identifier comprises raw data from a partial stack trace and wherein determining the identity of the mediation platform comprises analyzing the raw data to extract an identifier indicative of the mediation provider.

17. The method of claim 15, wherein the received identifier comprises an identifier indicative of the mediation provider extracted from the stack trace implementation code and wherein determining the identity of the mediation provider comprises determining the identity of the mediation provider corresponds to the identifier.

18. The method of claim 15, wherein selecting the second sponsored content item further comprises using the associated performance metric as part of a predictive model.

19. The system of claim 7, wherein the mediation platform affects the rendering of the content item.

20. The method of claim 15, wherein the mediation platform affects the rendering of the content item.

* * * * *